(12) United States Patent
Abe et al.

(10) Patent No.: US 7,619,963 B2
(45) Date of Patent: Nov. 17, 2009

(54) OFDM SIGNAL FRAME GENERATOR, TRANSMITTER, SIGNAL TRANSMISSION SYSTEM AND OFDM SIGNAL FRAME GENERATING METHOD

(75) Inventors: Tetsushi Abe, Yokohama (JP); Hirohito Suda, Yokosuka (JP); Shigeru Tomisato, Okayama (JP); Hiromasa Fujii, Yokosuka (JP); Takefumi Yamada, Kita-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 689 days.

(21) Appl. No.: 10/865,817

(22) Filed: Jun. 14, 2004

(65) Prior Publication Data
US 2005/0094552 A1 May 5, 2005

(30) Foreign Application Priority Data
Jun. 11, 2003 (JP) ............................. 2003-167043

(51) Int. Cl.
H04J 11/00 (2006.01)
H04J 1/00 (2006.01)
H04K 1/10 (2006.01)
H04L 27/28 (2006.01)

(52) U.S. Cl. ...................... 370/208; 370/480; 375/260
(58) Field of Classification Search .................. 370/430
See application file for complete search history.

(56) References Cited
U.S. PATENT DOCUMENTS
6,172,993 B1 * 1/2001 Kim et al. .................... 370/516

6,370,203 B1 * 4/2002 Boesch et al. ................ 375/297
6,587,510 B1 * 7/2003 Minami et al. ............... 375/285
2002/0122499 A1 * 9/2002 Kannan et al. ............... 375/260

(Continued)

FOREIGN PATENT DOCUMENTS
JP       11-163823       6/1999

(Continued)

OTHER PUBLICATIONS
Andreas Czylwik, "OFDM and Related Methods for Broadband Mobile Radio Channels", Broadband Communications, Accessing, Transmission, Networking, XP-010277036, Feb. 17, 1998, pp. 91-98.

(Continued)

Primary Examiner—William Trost, IV
Assistant Examiner—Andrew Chriss
(74) Attorney, Agent, or Firm—Oblon, Spivak, McClelland, Maier & Neustadt, L.L.P.

(57) ABSTRACT

An OFDM signal frame generator includes a rate determiner configured to determine rate information to generate a signal frame to be transmitted as an OFDM signal based on a value of a received signal quality. The signal frame generator further includes a pilot and data arrangement format determiner configured to determine a pilot and data arrangement format of the signal that is to be transmitted; power amplification rate determiner configured to determine a power amplification rate for the signal frame; data symbol generator configured to generate data symbol series to be transmitted based on the rate information and based on the power amplification rate; and transmission signal frame generator configured to generate the signal frame based on the generated data symbol series, on the number of pilot symbols, and based on the pilot & data arrangement format.

15 Claims, 19 Drawing Sheets

U.S. PATENT DOCUMENTS

| | | | |
|---|---|---|---|
| 2003/0043732 A1* | 3/2003 | Walton et al. | 370/208 |
| 2003/0086371 A1* | 5/2003 | Walton et al. | 370/235 |
| 2003/0153334 A1* | 8/2003 | Hokao | 455/502 |
| 2004/0228283 A1* | 11/2004 | Naguib et al. | 370/252 |

FOREIGN PATENT DOCUMENTS

| | | |
|---|---|---|
| JP | 2000-151548 | 5/2000 |
| JP | 2001-136226 | 5/2001 |
| JP | 2001-285089 | 10/2001 |
| JP | 2001-313685 | 11/2001 |
| JP | 2002-345035 | 11/2002 |
| JP | 2003-060609 | 2/2003 |
| JP | 2003-158499 | 5/2003 |

OTHER PUBLICATIONS

M. Münster, et al., "Co-Channel Interference Suppression Assisted Adaptive OFDM in Interference Limited Environments", Vehicular Technology Conference, vol. 1 Conf. 50, XP-000929056, Sep. 1999, pp. 284-288.

O. Simeone, et al., "Adaptive pilot pattern for OFDM systems", IEEE Communications Society, XP-010710082, Jun. 20, 2004, pp. 978-982.

* cited by examiner

Fig. 12

| | |
|---|---|
| EFFECTIVE OPERATION BAND (MHz) | 4 MHz |
| NUMBER OF FFT POINT | 128 POINTS |
| NUMBER OF SUB-CARRIER | 80 CARRIERS |
| INTERVAL OF SUB-CARRIER (kHz) | 50 kHz |
| OFDM SYMBOL PERIOD ($\mu$s) | 20 $\mu$s |
| GUARD INTERVAL ($\mu$s) | 5 $\mu$s (32 POINTS) |
| EFFECTIVE OFDM SYMBOL PERIOD ($\mu$s) | 25 $\mu$s (128+32 POINTS) |
| FRAME LENGTH | 0.5 msec |

Fig.13

| VALUE OF RECEIVED SIGNAL QUALITY | ENCODING RATE | MODULATION ORDER | SPREADING FACTOR | NUMBER OF INFORMATION BITS | TRANSMISSION SPEED |
|---|---|---|---|---|---|
| 1 | 1/2 | 4(QPSK) | 1 | 945 | 1890kbps |
| 2 | 3/4 | 4(QPSK) | 1 | 1425 | 2805kbps |
| 3 | 1/2 | 16(QAM) | 1 | 1905 | 3810kbps |

CRC:12bit, ENCODING CONSTRAINT LENGTH:4

Fig.14

| VALUE OF RECEIVED SIGNAL QUALITY | ENCODING RATE | MODULATION ORDER | SPREADING FACTOR | NUMBER OF INFORMATION BITS | TRANSMISSION SPEED |
|---|---|---|---|---|---|
| 0 | 3/7 | 4(QPSK) | 2 | 2 | 4kbps |
| 1 | 1/5 | 4(QPSK) | 1 | 945 | 1890kbps |
| 2 | 3/4 | 4(QPSK) | 1 | 1425 | 2805kbps |
| 3 | 1/2 | 16(QAM) | 1 | 1905 | 3810kbps |

PILOT ARRANGEMENT FORMAT 0:CRC:2bit
PILOT ARRANGEMENT FORMAT 1:CRC:12bit, ENCODING CONSTRAINT LENGTH:4

Fig.15

| VALUE OF RECEIVED SIGNAL QUALITY | PILOT & DATA ARRANGEMENT FORMAT |
|---|---|
| 0 | 0 |
| 1 | 1 |
| 2 | 1 |
| 3 | 1 |

Fig.16

| VALUE OF RECEIVED SIGNAL QUALITY | NUMBER OF PILOT SYMBOL |
|---|---|
| 0 | 48 |
| 1 | 640 |
| 2 | 640 |
| 3 | 640 |

Fig.17

| VALUE OF RECEIVED SIGNAL QUALITY | POWER AMPLIFICATION RATE |
|---|---|
| 0 | 20 |
| 1 | 1 |
| 2 | 1 |
| 3 | 1 |

Fig. 18

| EFFECTIVE OPERATION BAND (MHz) | 4.5 MHz |
|---|---|
| NUMBER OF FFT POINT | 256 POINTS |
| NUMBER OF SUB-CARRIER | 150 CARRIERS |
| INTERVAL OF SUB-CARRIER (kHz) | 30 kHz |
| OFDM SYMBOL PERIOD ($\mu$s) | 33.33 $\mu$s |
| GUARD INTERVAL ($\mu$s) | 8.3333 $\mu$s |
| EFFECTIVE OFDM SYMBOL PERIOD ($\mu$s) | 41.6667 $\mu$s |
| FRAME LENGTH | 2 msec |

OFDM SIGNAL FRAME GENERATOR, TRANSMITTER, SIGNAL TRANSMISSION SYSTEM AND OFDM SIGNAL FRAME GENERATING METHOD

BACKGROUND OF THE INVENTION

1. Field of the Invention

The present invention relates to generation of transmission signal frame with respect to orthogonal frequency division multiplexing (hereinafter, referred to as "OFDM") transmission system; and more particularly to an OFDM signal frame generator, a transmitter, a signal transmission system and an OFDM signal frame generating method.

2. Related Background Art

Recently, an OFDM transmission system has been applied to a radio LAN system such as IEEE.11a for practical use, and it is also under examination to apply the OFDM transmission system to surface digital broadcasting and cellar communication. The OFDM signal transmission system does not require frequency response equalization of multipath interference, which is caused from multiple propagation path, and then the system is suitable for broadband signal transmission.

Generally, in radio communication, the conditions of propagation path vary depending on the location of a reception terminal. Accordingly, adaptive modulation/demodulation technique, which changes the transmission rate at the transmitting party in accordance with the conditions of the propagation path, is employed. When carrying out the adaptive modulation/demodulation, a transmitter obtains value of received signal quality from a reception party, and changes the transmission rate in accordance with the value of received signal quality. The value of received signal quality is determined at the reception party using a desired value of received signal quality (desired frame error ratio), received signal power value, received signal noise-power ratio and Doppler frequency.

FIG. 1 shows an example of the conventional OFDM signal frame generator 93, to which the adaptive modulation/demodulation technique is applied. A transmission section comprises a frame generator 93, an OFDM modulator 92 and an RF section 91.

In the frame generator 93, the rate information determiner 94 determines the rate information using the value of received signal quality. Needless to say about the number of information bits, the encoding rate, the modulation order and the spreading factor, the rate information may include information other that the above or only a part of information of the above. A data symbol series generator 95 generates a piece of data symbol series in accordance with the rate information. When the reception party requires the rate information for demodulating, the rate information is also included in the information symbol series. A pilot symbol generator 96 generates pilot symbols. A multiplexer 97 arranges the generated data symbols and pilot symbols to a time-frequency slot, and generates a transmission signal frame. An OFDM modulator 92 OFDM-modulates the signal in the frame. The OFDM modulated signal is subjected to frequency conversion and transmitted by the RF section 91.

FIG. 2 shows a block diagram of an OFDM transceiver employing the conventional frame generator. A data symbol generator 95 in a transmitter 90 comprises an encoder 95A, mapping unit 95B for generating modulation order and a spreading unit 95C.

On the other hand, a receiver 80 comprises an RF section 81, an OFDM demodulator 82, a channel estimator 83, a received signal quality determiner 85 and a despreading/demapping/decoding unit 84. The received signal is down-converted by an RF section 81 and subjected to OFDM demodulation by an OFDM demodulator 82. The channel estimator 83 carries out channel estimation using the OFDM-demodulated signal and the pilot symbols. The channel estimator 83 estimates the channel value (amplitude and phase) of every sub-carrier used for transmission and the value of power of noise applied to a reception antenna. The received signal quality determiner 85 calculates the received signal-noise power ratio using the estimated channel value and the estimated noise power value. A value of received signal quality is determined using these values and a desired value of received signal quality. The despreading/demapping/decoding unit 84 demodulates the information symbol series using the estimated channel value and the OFDM-demodulated signal.

FIG. 3 shows an example of a generated transmission frame. Detailed OFDM signal parameters are shown in FIG. 12. The pilot & data arrangement format has such structure that, for each sub-carrier, 4 pilot symbols are arranged respectively at the head and tail of the frame, and 12 data symbols are arranged in the center of the frame. FIG. 13 shows a corresponding table of the value of received signal quality, the rate information (encoding rate, modulation order, spreading factor, number of information bit) and the resulting transmission rate, in the case where the pilot & data arrangement format in FIG. 3 is used. The rate determiner determines the above-mentioned rate information using the information in the corresponding table in FIG. 13 corresponding to the value of received signal quality "1-3", which is fed back from the receiver 80. For example, when the received signal quality is "1", to an input information symbol series of "945 bits", 12 bits of CRC (Cyclic Redundancy Check) bits are added resulting in 957 bits (approximately 960 bits). Furthermore, by carrying out FEC (Forward Error Correction) with encoding rate "½" and QPSK (Quadrature Phase Shift Keying) with 2 bits/Hz to spread with spreading factor "1", data symbol of 960 symbols are generated as symbols after encoding/modulating/spreading processing.

In the demodulation of the OFDM signal transmission, it is necessary to estimate the channel value of every sub-carrier at the reception party. Here, it is assumed that, as a channel estimation method, which is simple and has high estimation accuracy, in each sub-carrier, total eight pilot symbols are subjected to a synchronous addition to estimate the channel (it is assumed that the channel variation in a frame is extremely small).

In FIG. 3, Pp/Pi indicates pilot symbol power (Pp) per sub-carrier and power ratio per modulated symbol after despreading. Generally, to obtain satisfactory channel estimation accuracy, the value (Pp/Pi) is preferably about 6-10 dB. In the case of FIG. 3, Pp/Pi is about 9 dB. In the transmission signal frame, which is generated by the above conventional frame generator, the pilot & data arrangement format and the number of pilot symbols are fixed irrespective of the value of received signal quality.

A technique, in which the number of pilot symbols is adaptively changed to reliably carry out the OFDM communication, has been proposed (refer to Japanese Patent Application Laid-open Gazette No. 2000-151548).

SUMMARY OF THE INVENTION

However, in the above conventional frame generator, the pilot & data arrangement format is fixed. When the pilot & data arrangement format is fixed, the channel estimation accuracy is limited. Accordingly, in an OFDM transmission system, which employs the conventional frame generator, the following inconvenience resides in. That is, in a channel with extremely poor received signal quality (i.e., signal-noise power ratio is extremely low), even when it is attempted to establish a communication with a satisfactorily lowered transmission rate using an adaptive modulation/demodulation technique, the communication fails due to an error in channel estimation.

For example, FIG. 4 shows an example of a case where, under extremely poor value of received signal quality, the transmission rate is lowered to 4 kbps using the conventional frame generator. In this example, with a spreading factor of 240, the transmission rate is lowered. In FIG. 4, Pi gain indicates an increase of Pi in the structure shown in FIG. 4 with respect to Pi in the structure shown in FIG. 3. That is, by spreading to lower the transmission rate, when the reception party carries out despreading, a gain of approximately 24 dB per one modulation symbol is obtained. However, in this case, Pp/Pi decreases to "−14 dB"; thus, the channel estimation accuracy is degraded.

The present invention has been proposed to solve the above-described problem. An object of the present invention is to provide an OFDM signal frame generator, a transmitter, a signal transmission system and an OFDM signal frame generating method thereby, even in a communication channel of which received signal quality is extremely poor, it is possible to prevent such state that the communication fails.

In order to achieve the above object, an OFDM signal frame generator according to the present invention is an OFDM signal frame generator which comprises rate determining means that, based on a value of received signal quality at a receiver with respect to an OFDM signal received by the receiver, determines the rate information of the OFDM signal, pilot & data arrangement format determining means that, based on the value of received signal quality, determines a pilot & data arrangement format of the OFDM signal, pilot symbol number determining means that, based on the value of received signal quality, determines the number of pilot symbols of the OFDM signal, power amplification rate determining means that, based on the value of received signal quality, determines the power amplification rate of the OFDM signal, data symbol generating means that, based on the rate information and the power amplification rate, generates a piece of data symbol series to be transmitted, and transmission signal frame generating means that, based on generated data symbol, the number of pilot symbols and the pilot & data arrangement format, generates a transmission signal frame of the OFDM signal to be transmitted.

Also, a transmitter according to the present invention is a transmitter that transmits OFDM signal characterized by including the above OFDM signal frame generator.

Further, a signal transmission system according to the present invention is a signal transmission system, including a transmitter that transmits OFDM signal and a receiver for receiving the OFDM signal, wherein the receiver comprises received signal quality determining means for determining the value of received signal quality at the receiver with respect to the received OFDM signal, and feedback means for feeding back the determined value of received signal quality to the transmitter; the transmitter comprises: rate determining means that, based on the value of received signal quality obtained by the feedback, determines the rate information of the OFDM signal, pilot & data arrangement format determining means that, based on the value of received signal quality, determines a pilot & data arrangement format of the OFDM signal, pilot symbol number determining means that, based on the value of received signal quality, determines the number of pilot symbols of the OFDM signal, power amplification rate determining means that, based on the value of received signal quality, determines the power amplification rate of the OFDM signal, data symbol generating means that, based on the rate information and the power amplification rate, generates data symbol series to be transmitted, and transmission signal frame generating means that, based on generated data symbol, the number of pilot symbols and the pilot & data arrangement format, generates a transmission signal frame of the OFDM signal to be transmitted.

Furthermore, an OFDM signal frame generating method according to the present invention is an OFDM signal frame generating method of, in a transmitter that transmits OFDM signal to a receiver, generating a transmission signal frame of the OFDM signal, which comprises a rate determining step of, based on a value of received signal quality at a receiver with respect to an OFDM signal received by the receiver, determining the rate information of the OFDM signal, a pilot & data arrangement format determining step of, based on the value of received signal quality, determining a pilot & data arrangement format of the OFDM signal, a pilot symbol number determining step of, based on the value of received signal quality, determining the number of pilot symbols of the OFDM signal, a power amplification rate determining step of, based on the value of received signal quality, determining the power amplification rate of the OFDM signal, a data symbol generating step of, based on the rate information and the power amplification rate, generating data symbol series to be transmitted, and a transmission signal frame generating step of, based on generated data symbol, the number of pilot symbols and the pilot & data arrangement format, generating a transmission signal frame of the OFDM signal to be transmitted.

According to the above-described inventions, based on the value of received signal quality at a receiver with respect to an OFDM signal-received by the receiver, the rate information of the OFDM signal, the pilot & data arrangement format of the OFDM signal, the number of pilot symbols of the OFDM signal and the power amplification rate of the OFDM signal are determined, respectively. Further, based on the rate information and the power amplification rate, data symbol series to be transmitted is generated; and based on the data symbol, the number of pilot symbols and the pilot & data arrangement format, the transmission signal frame of the OFDM signal to be transmitted is generated.

As described above, in the present invention, it is possible to generate the transmission signal frame of the OFDM signal by changing the pilot & data arrangement format, the number of pilot symbols and the power amplification rate in accordance with the value of received signal quality. Owing to this, even in a channel of which received signal quality is poor, the transmission rate is satisfactorily lowered using the adaptive modulation technique, and the number of pilot symbols and the pilot & data arrangement format are changed to maintain the channel estimation accuracy to a satisfactory level. Thus, it is possible to prevent such a state of the communication failure.

As for the generation of the transmission signal frame of the OFDM signal, the following methods may be employed. That is, after generating the pilot symbols as many as the number of pilot symbols, the generated pilot symbols and data symbols are synthesized in accordance with the pilot & data arrangement format; or, in the synthesizing process in accordance with the pilot & data arrangement format, the data symbols and the pilot symbols as many as the symbol number are synthesized.

In the above-described cases, it is preferred to arrange so that the receiver feeds back the value of received signal quality to the OFDM signal frame generator. By feeding back the value of received signal quality from the receiver to the OFDM signal frame generator, the OFDM signal frame generator can change the pilot & data arrangement format and the number of pilot symbols in accordance with an appropriate value of received signal quality, and generate the transmission signal frame of the OFDM signal.

Also, it may be arranged so that the pilot & data arrangement format is determined with respect to the used sub-carrier number, the number of pilot symbols in the used sub-carrier and the number of data symbols. In this case, it is possible to generate the transmission signal frame of the OFDM signal based on the generated data symbol, the number of pilot symbols and the pilot & data arrangement format.

In the pilot & data arrangement format as described above, it may be arranged so that the used sub-carrier number is selected at specific intervals on the frequency slot of the transmission signal frame. In this case, by using a plurality of sub-carriers selected at specific intervals on the frequency slot, it is possible to obtain the frequency diversity effect, and thus the communication quality is improved.

Also, it may be arranged so that the used sub-carrier number is changed depending on the frame number. In this case, since different sub-carrier is used in different transmission frame (different time), the frequency diversity gain can be obtained.

Also, in the pilot & data arrangement format, it may be preferably arranged so that the frame length is variable depending on the value of received signal quality. In this case, degree of freedom in the generation of the transmission signal frame increases; thus flexible control is available. For example, when the variation of the channel in one frame is extremely small to be assumed as fixed (no variation in the channel), by increasing the frame length, the gain of the power used for the data symbol can be increased. Furthermore, the pilot &data arrangement format determining means may preferably assign the sub-carriers, to which the pilot & data arrangement format is applied based on the value of received signal quality, on the block basis. To be more specific, when there is little variation in the channel, there may be such a state that ten frames can be received using the same estimated channel value. In such case, for example, the first frame is arranged using such format that includes the pilots only and each of the second frame to the tenth frame is arranged using such format that includes data only so that the frame information in several frames can be determined; thus, the amount of transmission data can be increased.

The various arrangements on configuration as described above may be made on the OFDM signal frame generator according to the present invention or on the transmitter according to the present invention.

BRIEF DESCRIPTION OF THE DRAWINGS

FIG. 12 is a table showing a first example of parameters of OFDM signal.

FIG. 13 is a table showing an example of relationship between value of received signal quality and rate information, which is used in a conventional rate-determiner.

FIG. 14 is a table showing an example of relationship between value of received signal quality and rate information, which is used in a rate-determiner according to the embodiment.

FIG. 15 is a table showing an example of relationship between value of received signal quality and pilot & data arrangement format, which is used in a pilot arrangement-determiner according to the embodiment.

FIG. 16 is a table showing an example of relationship between value of received signal quality and number of pilot symbols, which is used in a pilot symbol number determiner according to the embodiment.

FIG. 17 is a table showing an example of relationship between value of received signal quality and power amplification rate, which is used in a power-amplification rate determiner according to the embodiment.

FIG. 18 is a table showing a second example of parameters of OFDM signal.

DESCRIPTION OF THE PREFERRED EMBODIMENTS

Hereinafter, embodiments according to the present invention will be described.

[Configuration of the Device]

Figure 1:
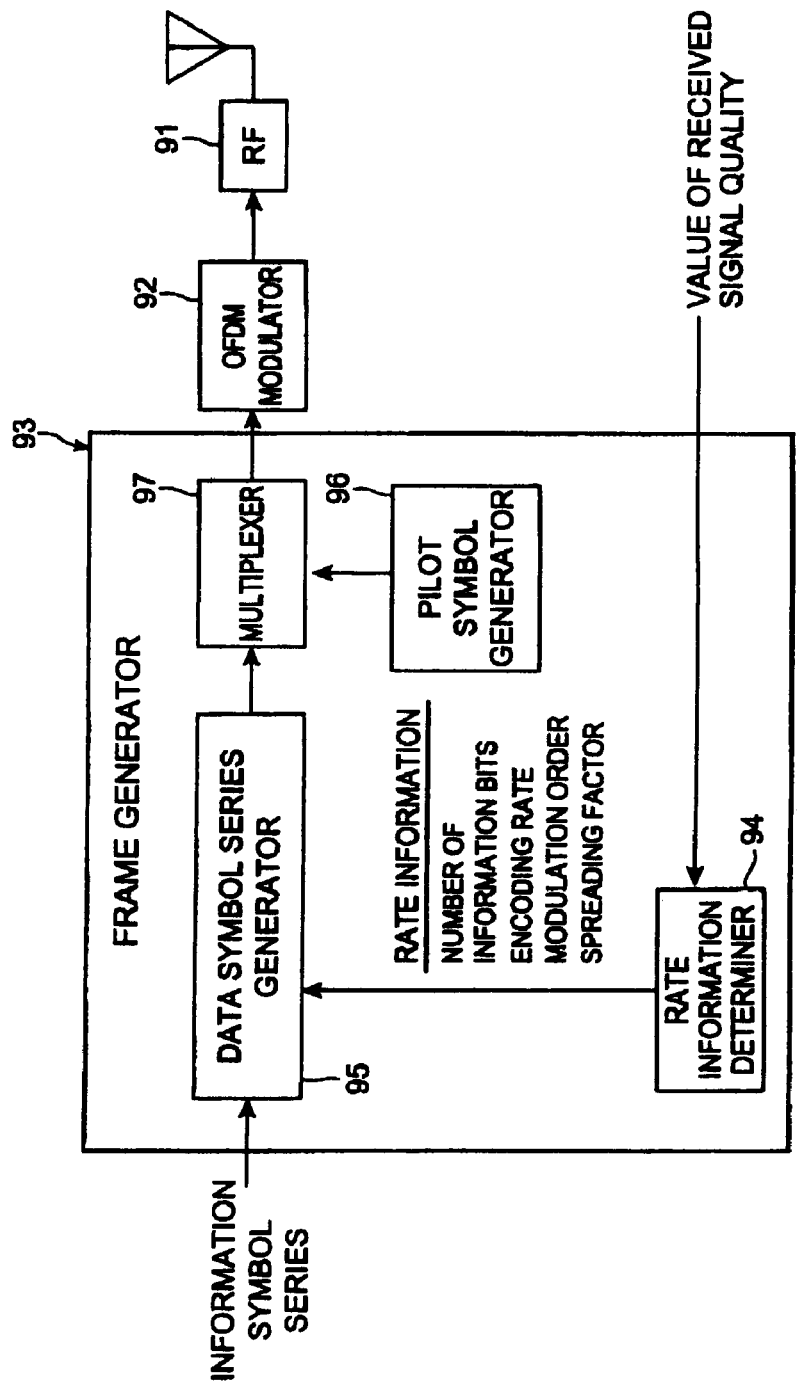
FIG. 1 is a view showing the configuration of a conventional frame generator.
Figure 5:
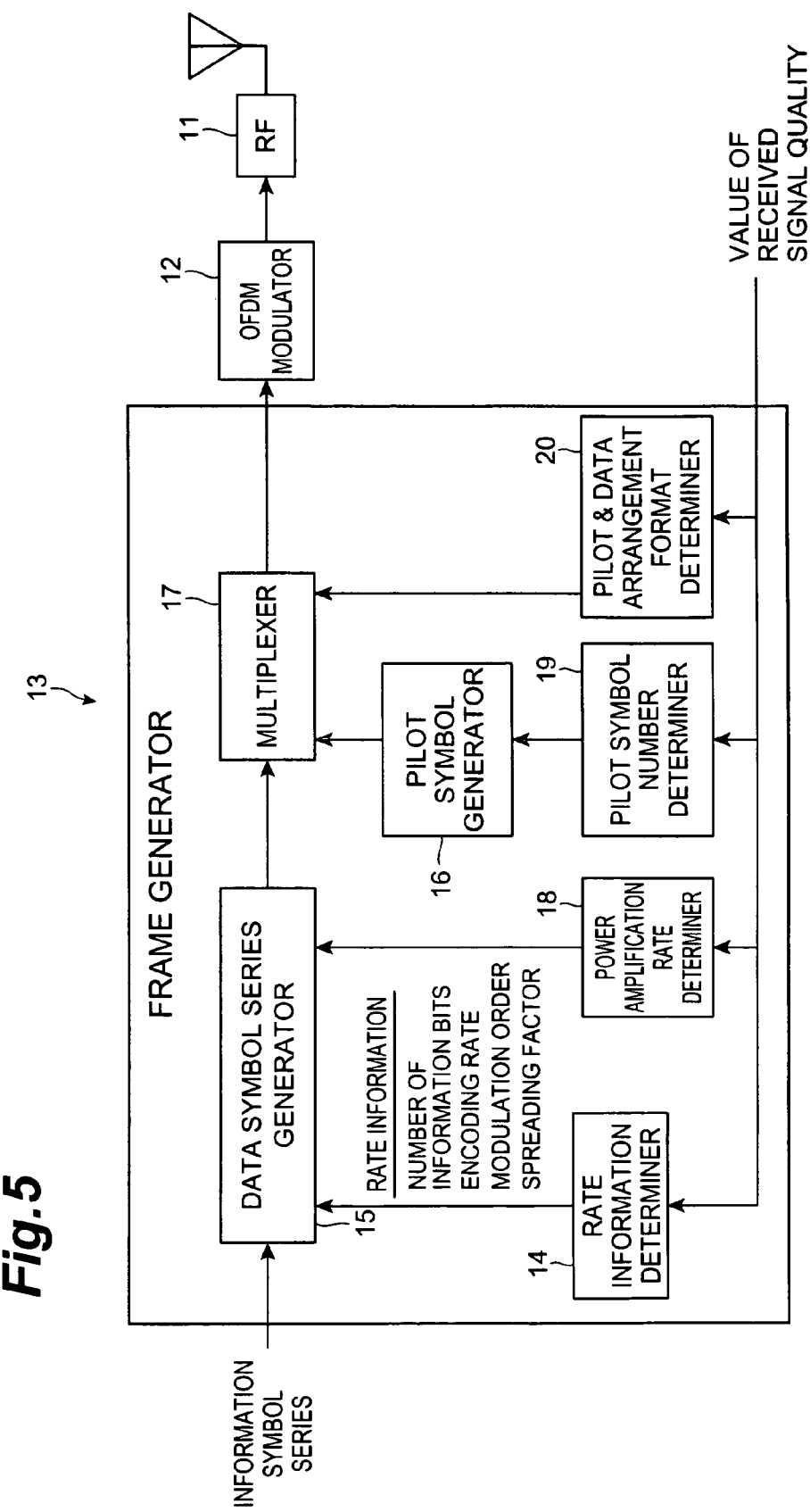
FIG. 5 is a view showing the configuration of a frame generator in accordance with an embodiment of the invention.

FIG. 5 shows a block diagram of an OFDM signal frame generator 13 in this embodiment. Differences from the conventional frame generator 93 shown in FIG. 1 are as described below. That is, the frame generator 13 shown in FIG. 5 has a pilot & data arrangement format determiner 20 so as to change the pilot & data arrangement format depending on the value of received signal quality. Also, the frame generator 13 has a pilot symbol number determiner 19 so as to change the number of the pilot symbols depending on the value of received signal quality. Further, the frame generator 13 has a power amplification rate determiner 18 so as to change the power amplification rate depending on the value of received signal quality.

Figure 2:
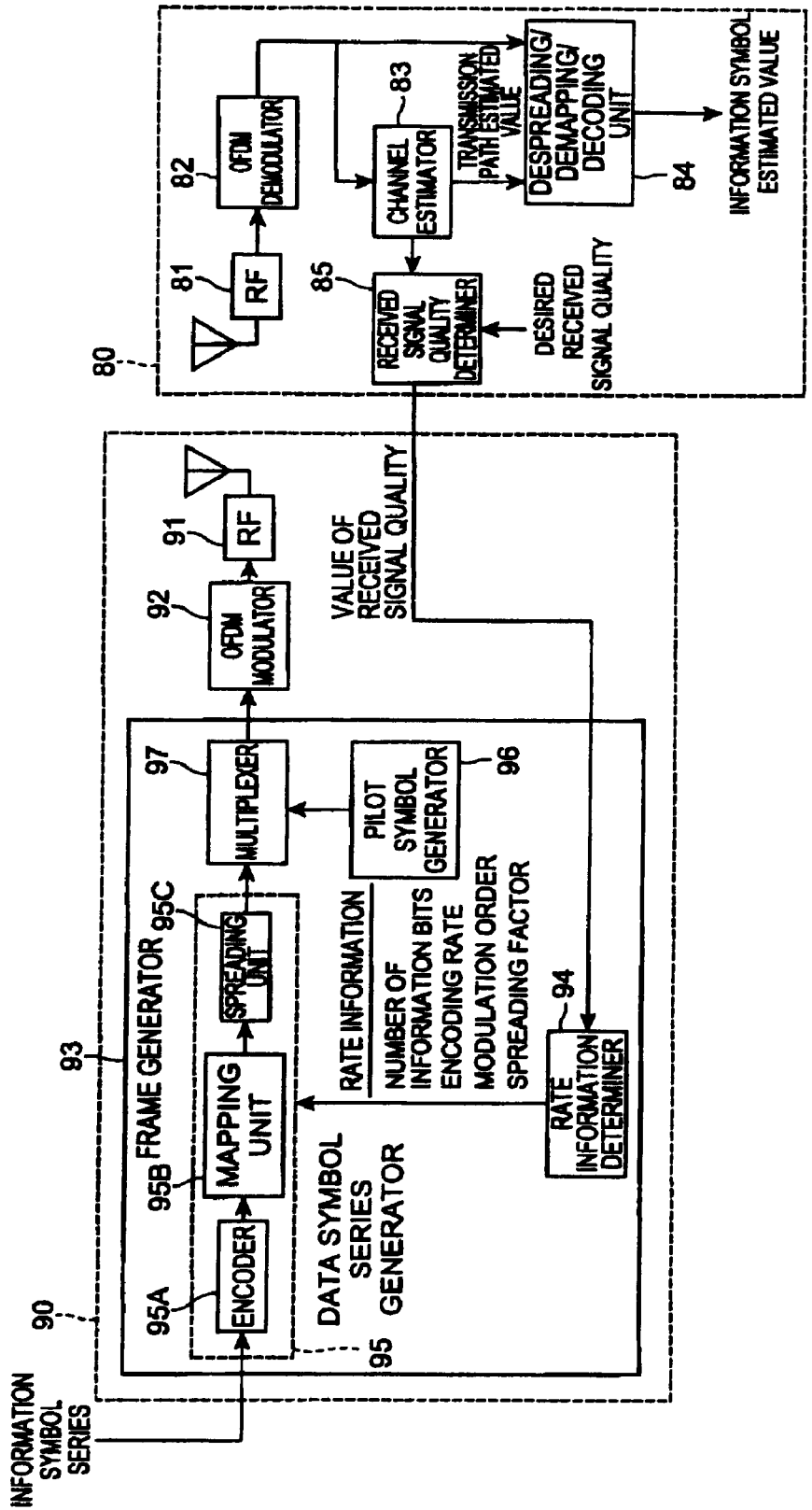
FIG. 2 is a block diagram of an OFDM signal transmission system employing the conventional frame generator.
Figure 6:
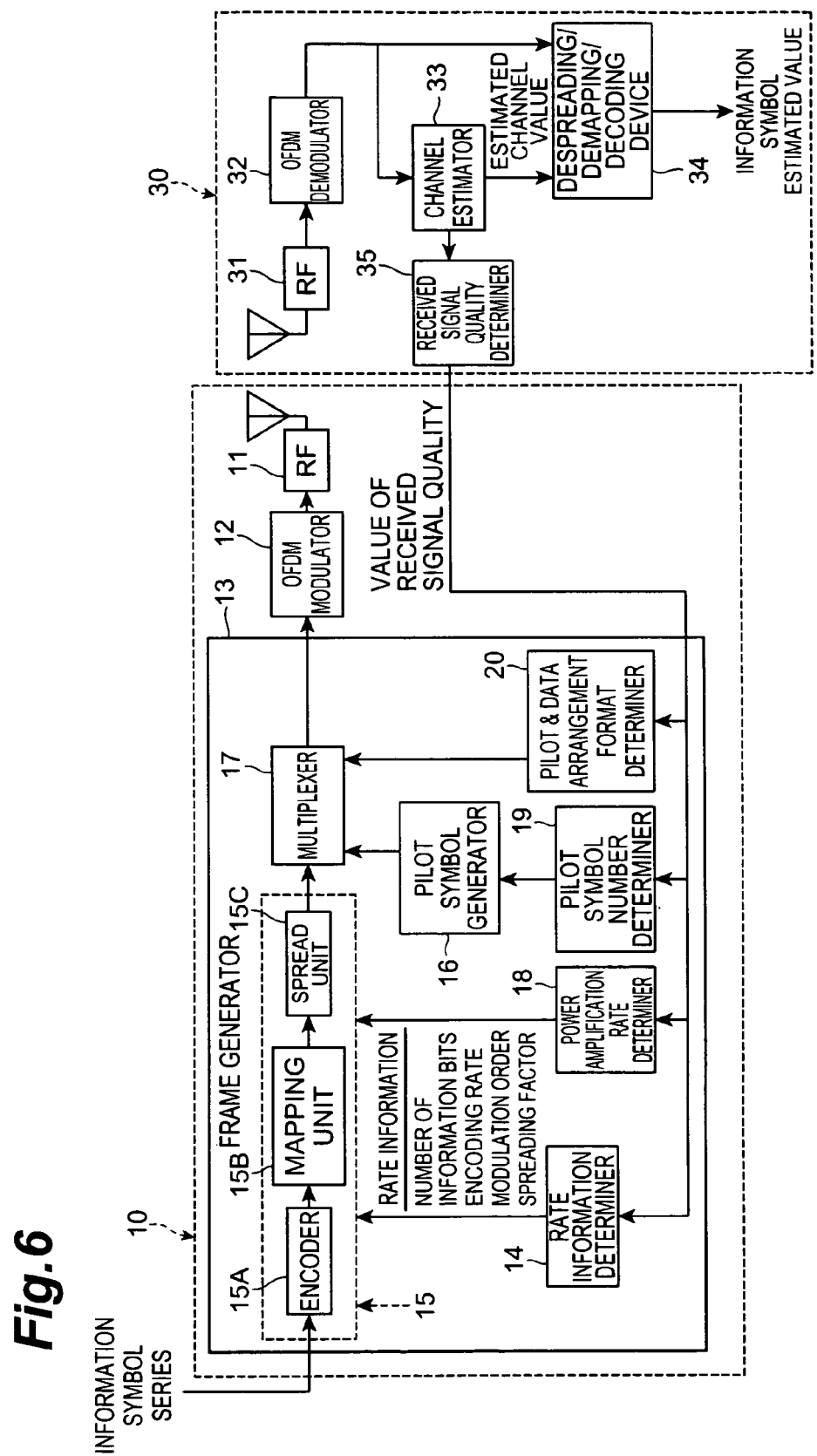
FIG. 6 is a block diagram of an OFDM signal transmission system employing a frame generator according to the embodiment of the invention.

FIG. 6 is a block diagram showing an OFDM signal transmission system 1 employing the above-mentioned frame generator 13. The OFDM signal transmission system 1 is composed of a transmitter 10 provided with the frame generator 13 in FIG. 5 and a receiver 30. Since, the configuration of the receiver 30 is the same as that of the above-described receiver 80 in FIG. 2, the description thereof will be omitted here.

The OFDM signal transmission system 1 is characterized in the configuration of the frame generator 13 provided to the transmitter 10. Same as the conventional type, the rate information determiner 14 in the frame generator 13 determines a piece of rate information (encoding rate, modulation order, spreading factor) depending on the value of received signal quality. At this time, a corresponding table between the value of received signal quality and the rate information shown in FIG. 14 is used. In this FIG. 14, as the rate information corresponding to the value of received signal quality 0, a piece of low-speed rate information of 4 kbps is added.

The pilot & data arrangement format determiner 20 determines a pilot & data arrangement format using a corresponding table between the value of received signal quality and a pilot & data arrangement format shown in FIG. 15. As demonstrated in FIG. 15, when the quality value of a received signal is 0 (a case of low-rate transmission), a pilot & data arrangement format, which is different from that in the case where the quality value of the received signal is other than 0 (the received signal is any one of 1-3), is used.

The pilot symbol number determiner 19 determines the number of pilot symbols using a corresponding table between the value of received signal quality and number of pilot symbols shown FIG. 16. When the quality value of the received signal is 0 (a case of low-rate transmission), number of pilot symbols, which is different from that in the case where the value of received signal quality is other than 0 (the value is any one of 1-3), is used.

The power amplification rate determiner 18 determines the power amplification rate using a corresponding table between value of received signal quality and power amplification rate shown in FIG. 17. This power amplification rate is used when a part of sub-carrier only is used as the pilot & data arrangement format (detailed description will be given later). For example, when only a half of available sub-carriers is used and total transmission power is assigned to the half of the sub-carriers, power amplification rate will be "2". When the power amplification is not carried out, the power amplification rate is fixed to "1".

[OFDM Signal Frame Generating Processing]

Figure 19:
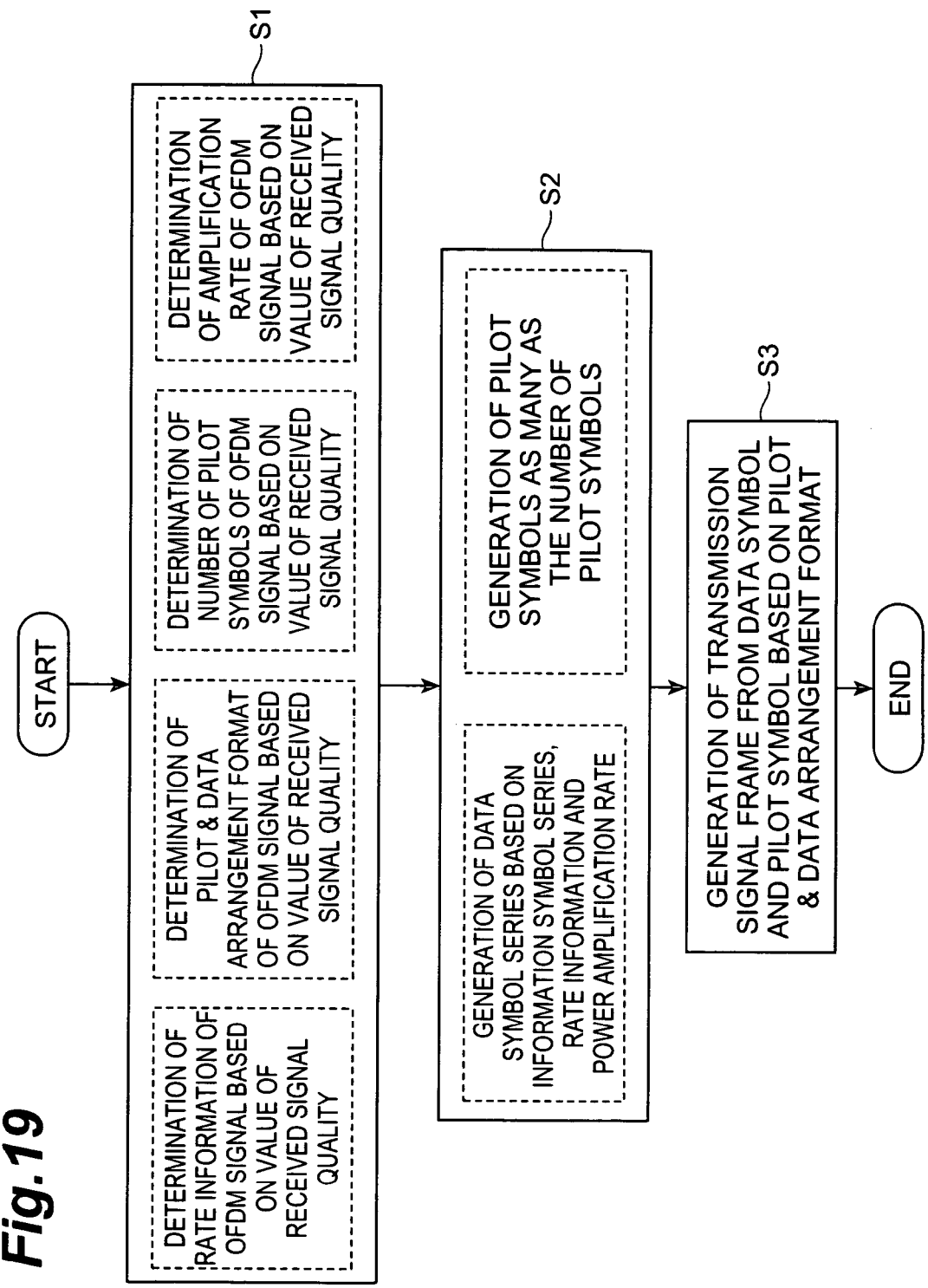
FIG. 19 is a flowchart showing content of OFDM signal frame-generating processing.

Next, referring to FIG. 19, OFDM signal frame generating processing, which is carried out in the frame generator 13 in FIG. 5, will be described.

First of all, in S1, based on the value of received signal quality at the receiver 30 with respect to an OFDM signal received by the receiver 30, rate information of an OFDM signal to be transmitted, pilot & data arrangement format of the OFDM signal, number of pilot symbols of the OFDM signal and power amplification rate of the OFDM signal are determined respectively. Here, the rate information is determined by the rate information determiner 14; the pilot & data arrangement format is determined by the pilot & data arrangement format determiner 20; the number of pilot symbols is determined by the pilot symbol number determiner 19; and power amplification rate is determined by the power amplification rate determiner 18, respectively. The above value of received signal quality is a value fed back to the transmitter 10 from the receiver 30.

Then, in S2, a piece of data symbol series and pilot symbols are generated respectively. Here, the data symbol series generator 15 carries out a processing on the input information symbol series depending on the rate information and the power amplification rate, which are determined in S1 to generate the data symbol series. The pilot symbol generator 16 generates the pilot symbols as many as the determined number of pilot symbols.

In S3, based on the pilot & data arrangement format, the generated data symbols and pilot symbols are synthesized to generate a transmission signal frame for the OFDM signal.

As described above, according to this embodiment, by changing the pilot & data arrangement format, the number of pilot symbols and the power amplification rate depending on the value of received signal quality, the transmission signal frame for the OFDM signal can be generated. Owing to this, even in a channel of which received signal quality is poor, the transmission rate is satisfactorily reduced by using the adaptive modulation technique, and the channel estimation accuracy is also maintained in a satisfactory condition by changing the number of pilot symbols and the pilot & data arrangement format. Thereby, it is possible to prevent such a state of the communication failure.

[Various Examples of the Pilot & Data Arrangement Format for Low-Speed Transmission Corresponding to the Value of Received Signal Quality 0]

Hereinafter, various examples of the pilot & data arrangement format for low-speed transmission (4 kbps) corresponding to the value of received-signal quality "0" will be described. Here, under the following assumptions, a guideline for determining the pilot & data arrangement format to carry out low-speed transmission, will be given.

(Assumptions)

Assumption 1: pilot symbols are inserted into every carrier used for transmission to carry out channel estimation.

Assumption 2: the transmission power used for transmitting one frame is P.

Assumption 3: the number of data symbols after symbol mapping before spreading to be transmitted by one frame transmission is N.

Assumption 4: the power used for data symbol is $P_i$.

Assumption 5: the power used for pilot symbols is $P_p = P - P_i$.

Assumption 6: the number of sub-carriers used for transmission is K.

As described above, generally, in signal transmission, to achieve a satisfactory accuracy in the channel estimation, it is necessary to maintain the power ratio between the power of the pilot symbols used per one carrier and the power for one modulation of data symbol before spreading, to a fixed level (approximately 8 dB). Assuming that the power ratio is D, the above conditions are expressed by the following formula (1):

$$\left(\frac{P - P_i}{K}\right) / \left(\frac{P_i}{N}\right) = D \tag{1}$$

When the formula (1) is solved for $P_i$, the following formula (2) is obtained.

$$P_i = \frac{N \cdot P}{D \cdot K + N} \tag{2}$$

In a channel of which received signal quality (received signal power-noise power ratio) is poor, $P_i$ has to be increased. Accordingly, from the formula (2), it is understood that the smaller number of sub-carriers K is the more preferable. However, in fading channel, when the number of sub-carriers K is small, such trade-off is resulted in; i.e., the quality improvement owing to frequency diversity is hardly obtained by the demodulation.

Accordingly, from the above examination, in low-speed transmission, it is preferred to arrange the transmission signal frame as below; i.e., the number of used sub-carriers is reduced to a extent that the frequency diversity effect is obtained to assign the power to the small number of sub-carriers.

Figure 7:
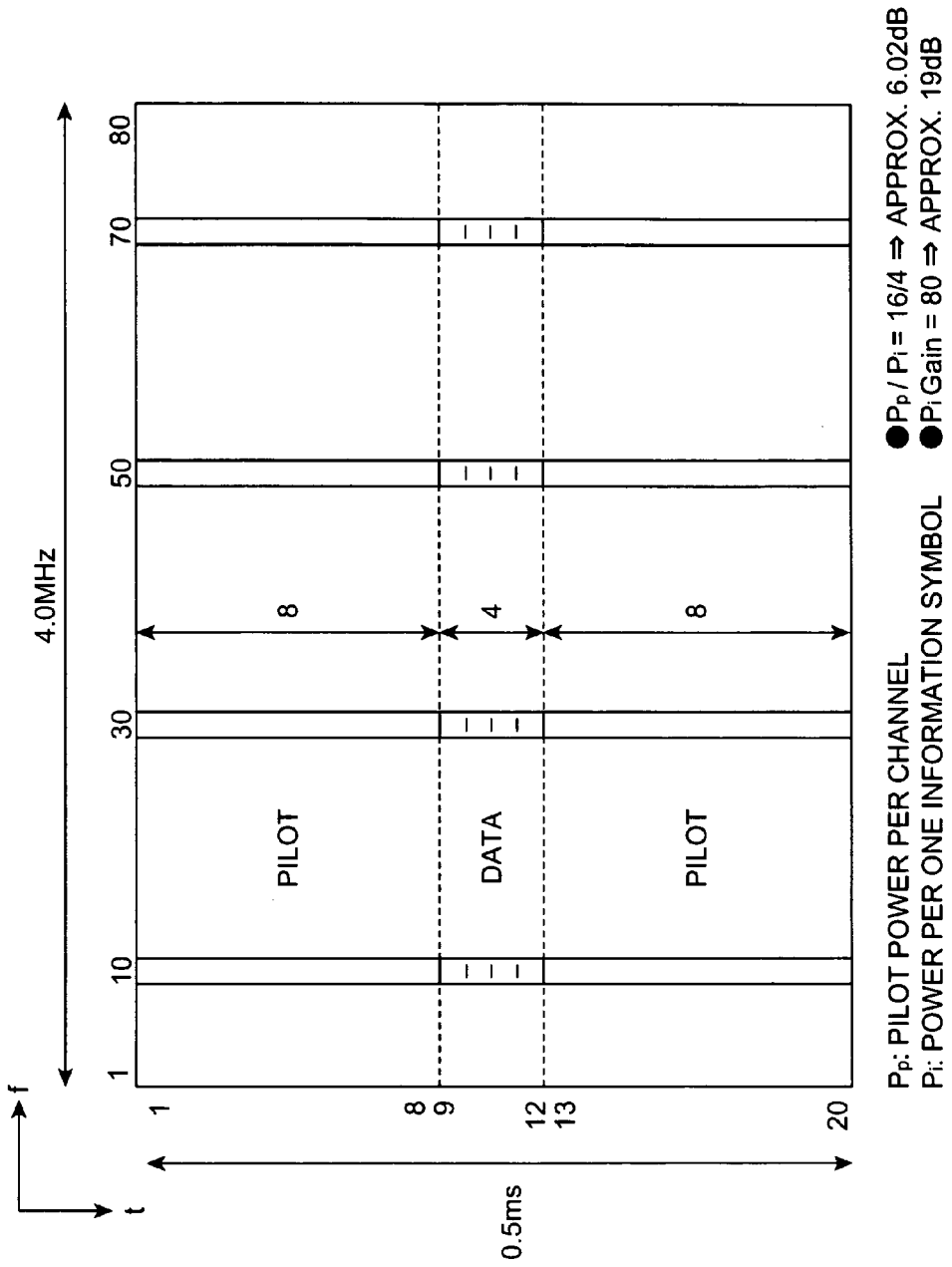
FIG. 7 is a view showing a first example of a pilot & data arrangement format.

FIG. 7 shows a first example of the pilot & data arrangement format for low-speed transmission, which is provided by using the above-described guideline. Here, the modulation flow of the information symbol series is, for example, as described below. To "2 bits" of the input information symbol series, 2 bits of the CRC bit are added resulting in 4 bits. And the input information symbol series are subjected to the FEC with an encoding rate of "4/7" using a BCH code of rate "4/7" and the "QPSK" of 2 bit/Hz, and spread the same with a spreading factor of "4". Thus, data symbols of 16 chips are generated as the symbols after encoding/modulating/spreading.

Figure 3:
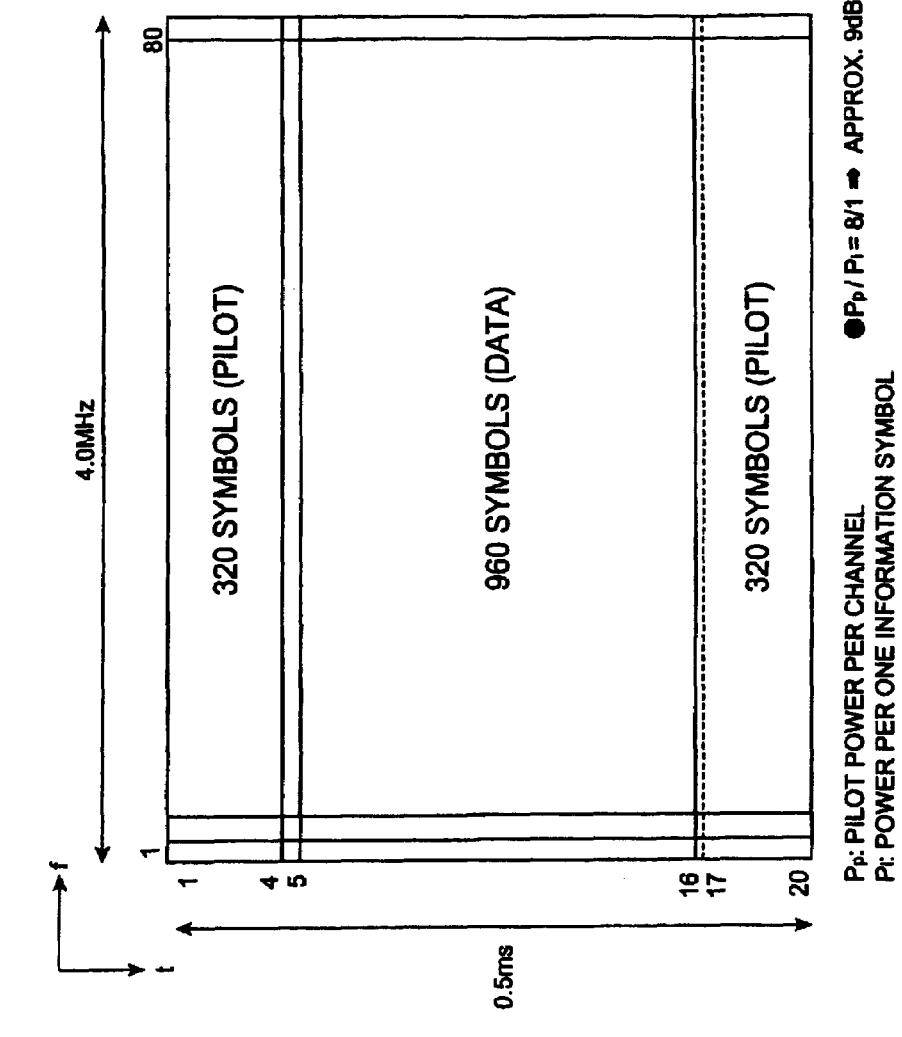
FIG. 3 is a view showing an example of the configuration of a conventional frame.
Figure 4:
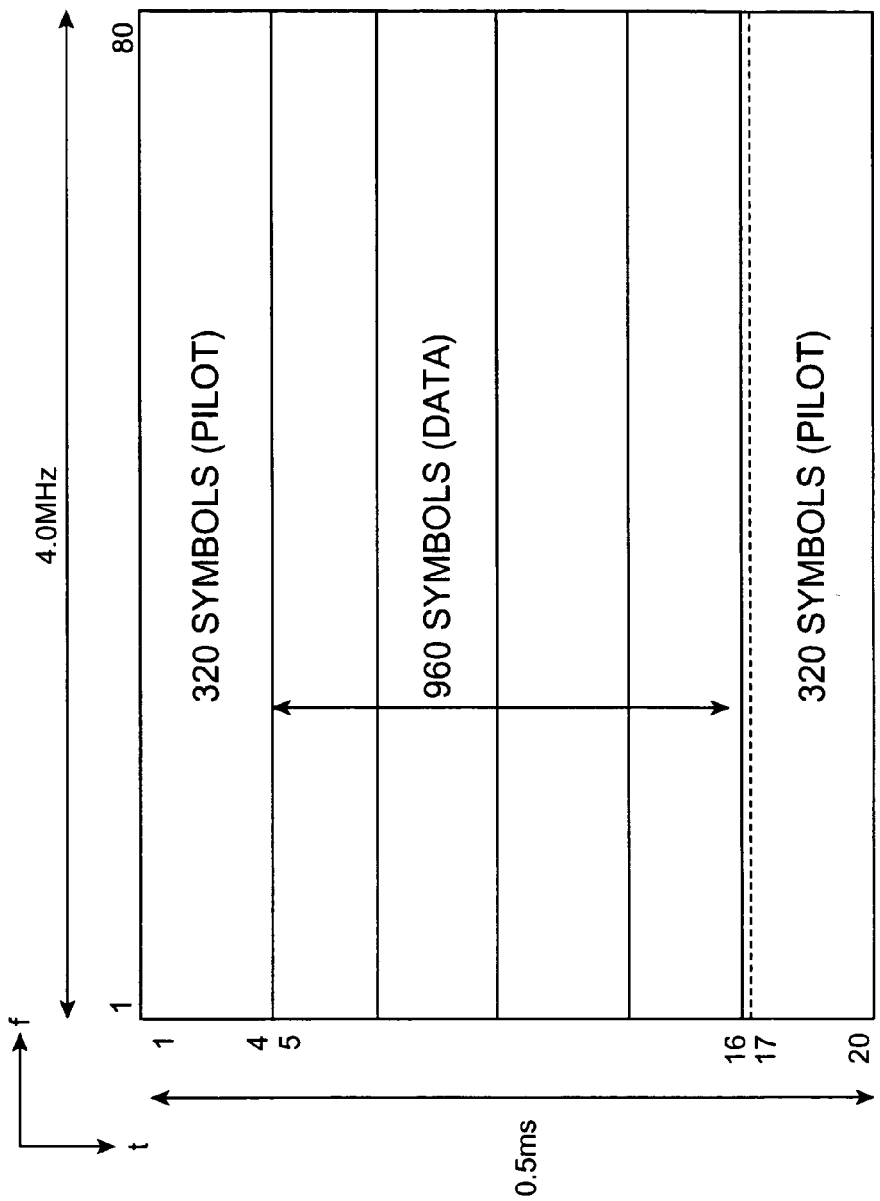
FIG. 4 is a view showing an example of the configuration of a conventional low-speed frame.

In the case of FIG. 7, four sub-carriers, which are used for transmission, are previously selected, and the four sub-carriers only are used for transmission of one frame. In this case, since the entire power is assigned to the four sub-carriers, the power amplification rate is "20". By also taking into account that the spreading factor is "4", in this case, a Pi gain compared to FIG. 3 is 80 (=20×4) which is approximately 19 dB, and the Pp/Pi is maintained to approximately 6 db. Also, by using the four sub-carriers, a frequency diversity gain can be obtained. The number of the above carriers to be used may be more than four.

Figure 8:
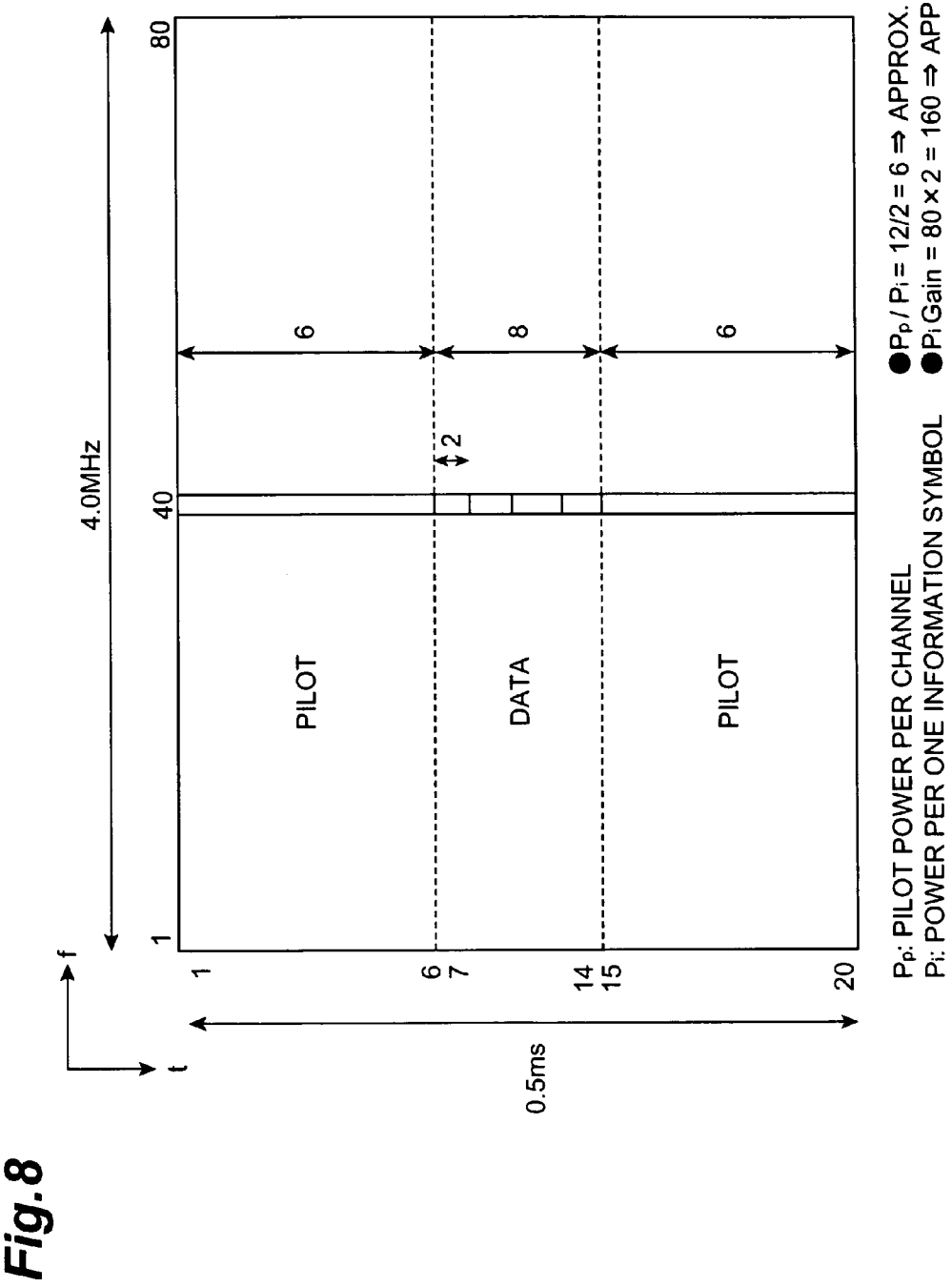
FIG. 8 is a view showing a second example of the pilot & data arrangement format.

FIG. 8 shows a second example of the pilot & data arrangement format for low speed provided by the present invention. In the case of FIG. 8, the sub-carrier used for transmission is only one; and to the singe sub-carrier, the entire transmission power is assigned (the power amplification rate is "80"). The modulation flow of the information symbol series in this case is, for example, as described below. To "2 bits" of the input information symbol series, 2 bits of the CRC bit are added resulting in 4 bits. The information symbol series are subjected to the FEC with an encoding rate of "4/7" using a BCH code of a rate "4/7" and the "QPSK" of 2 bit/Hz to spread the same with a spreading factor of "2". Thereby, as the symbols after encoding/modulating/spreading, data symbols of 8 chips are generated. In this case, the Pi gain is increased to approximately 22 dB, and the Pp/Pi is also increased to approximately 8 dB. However, in this case, since a single sub-carrier is used, the frequency diversity at the demodulation is not obtained. However, when the receiver has a plurality of reception antennas, the loss of frequency diversity is compensated by the reception diversity gain.

Figure 9:
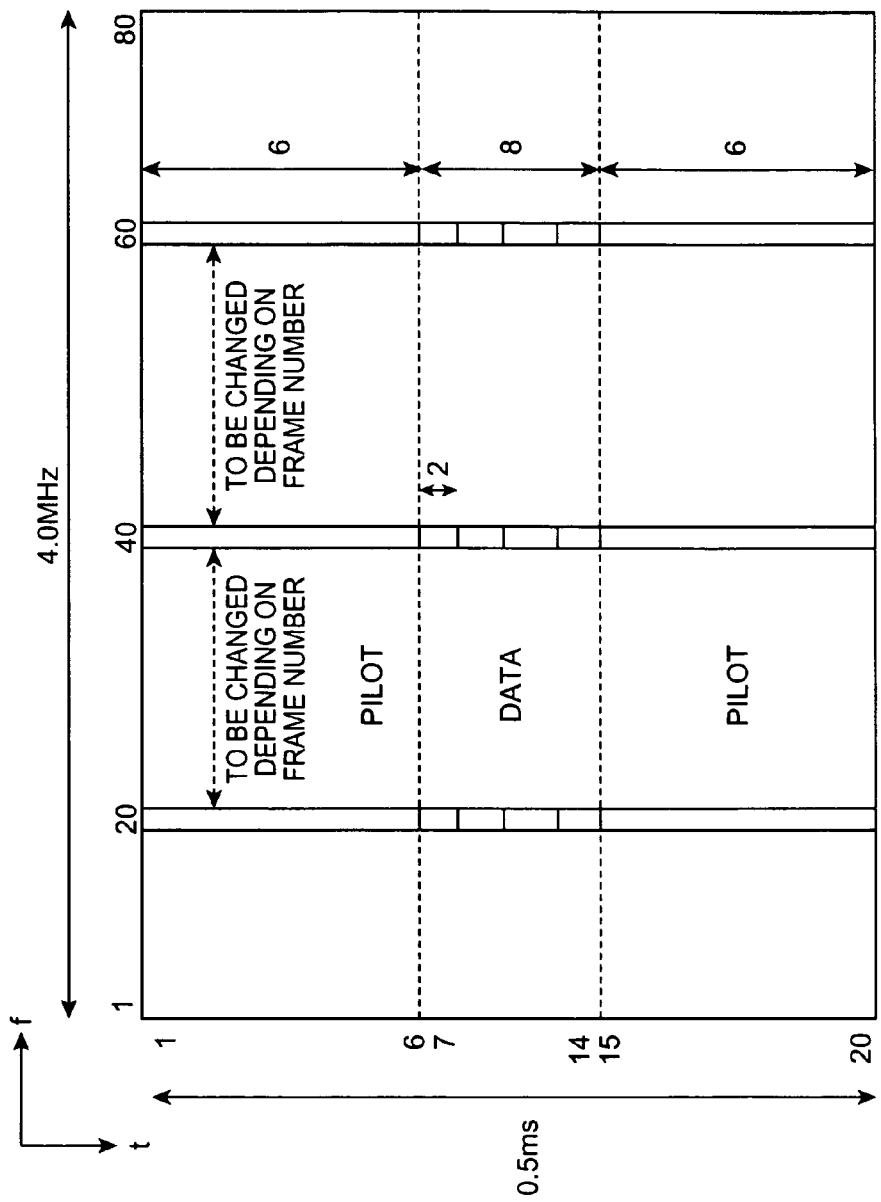
FIG. 9 is a view showing a third example of the pilot & data arrangement format.

FIG. 9 shows a third example of the low-speed pilot & data arrangement format, which is provided by the present invention. In FIG. 9, the number of the sub-carrier (in FIG. 9, one sub-carrier), which is used for transmission, is changed in accordance with the frame number. As for the changing reference, a pattern, which is previously known by the receiver, can be used. By using this configuration, since different sub-carrier is used in different transmission frame (different time), the frequency diversity effect is expected. In this example, the modulation flow of the information symbol series is the same as that of the above-described second example.

Figure 10:
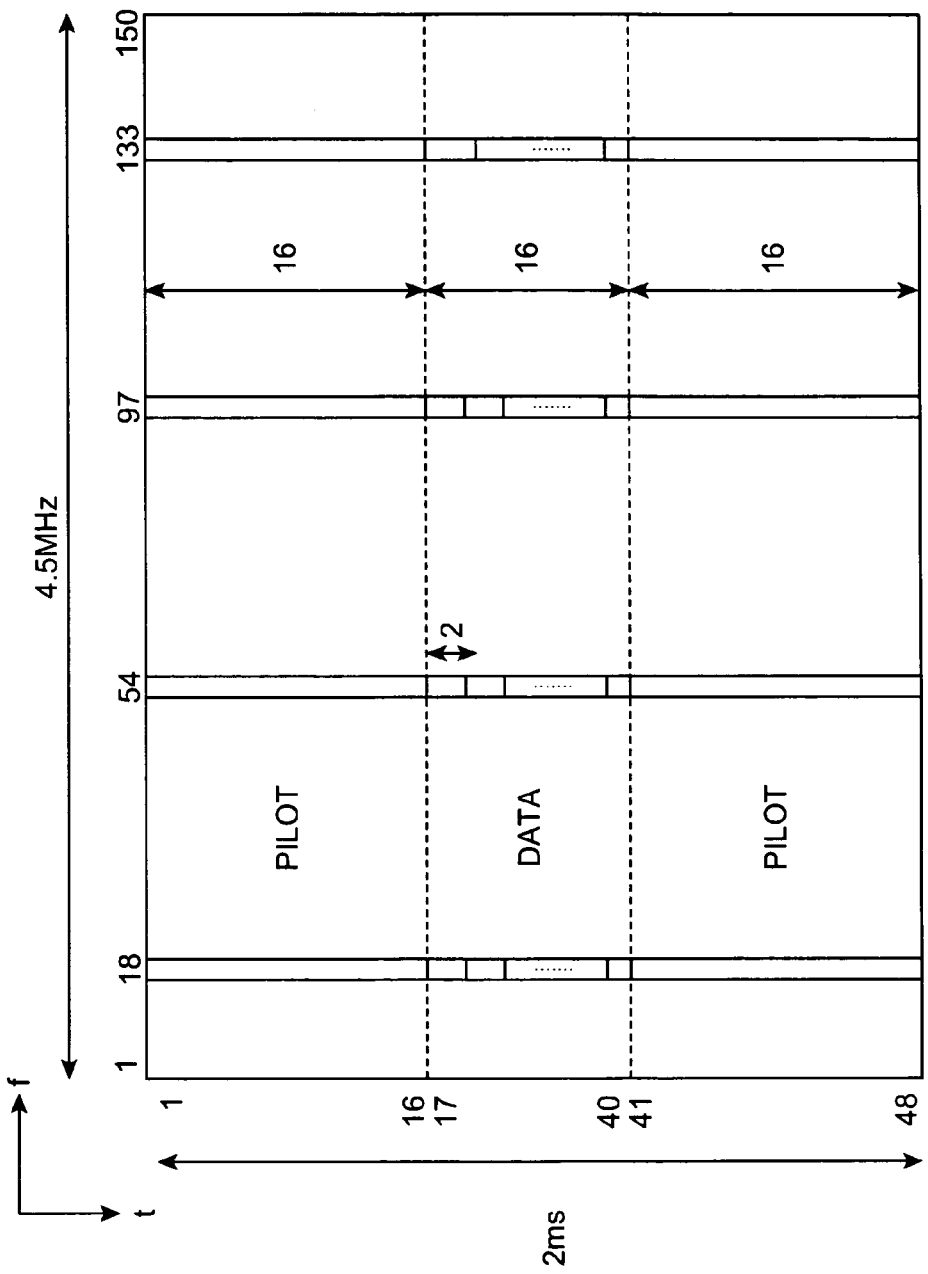
FIG. 10 is a view showing a fourth example of the pilot & data arrangement format.
Figure 11:
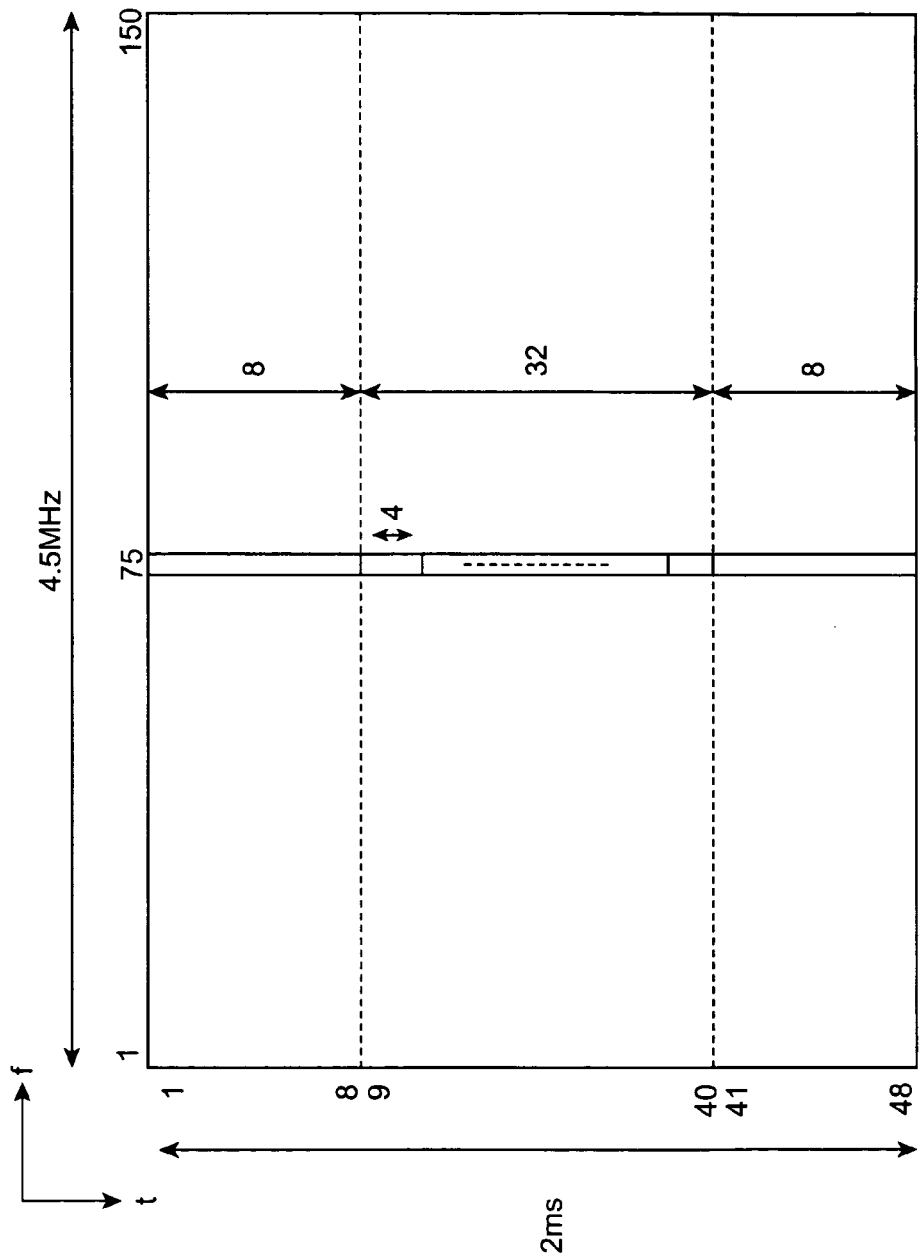
FIG. 11 is a view showing a fifth example of the pilot & data arrangement format.

FIG. 10 and FIG. 11 show a fourth and fifth examples respectively of the pilot & data arrangement format, which are provided by the present invention. Compared to the above-described first-third examples (configuration shown in FIG. 7-FIG. 9), the OFDM signal parameters are changed. Referring to FIG. 18 showing the details, it is understood that the Pi gain can be increased upon lengthening the frame length. In this example also, it is assumed that the change of channel due to the phasing in one frame is extremely small. The modulation flow of the information symbol series in the fourth example shown in FIG. 10 is, for example, as described below. To "8 bits" of the input information symbol series, 3 bits of the CRC bit are added resulting in 11 bits. The input information symbol series are subjected to the FEC using the BCH code of 4 bits and the "QPSK" of 2 bit/Hz, and by spreading the same with a spreading factor of "8", data symbols of 64 chips are generated as the symbols after coding/modulating/spreading. On the other hand, the modulation flow of the information symbol series in the fourth example in FIG. 11 is, for example, as described below. To "8 bits" of the input information symbol series, 3 bits of the CRC bit are added resulting in 11 bits. The input information symbol series are subjected to the FEC using the BCH code of 4 bits and the "QPSK" of 2 bit/Hz, and spread the same with a spreading factor of "4". Thus, data symbols of 32 chips are generated as the symbols after coding/modulating/spreading.

From the first-fifth examples (FIGS. 7-11), as possible frame configurations for slow-speed transmission, plural frame configurations are available. Accordingly, one of them is selected and the pilot & data arrangement format in FIG. 15 is determined as "0". Also, in the pilot & data arrangement format "0", it is possible to diversify in the modulation order, the encoding rate and the spreading factor, and plural pieces of rate information other than 4 kbps may be included. Further, the number of the pilot & data arrangement formats can be increased.

Furthermore, as demonstrated in the second and third examples (FIG. 8 and FIG. 9), in the case where the variation of the channel in one frame is extremely small to be assumed as fixed (no changes in channel), the Pi gain can be increased by lengthening the frame length. Accordingly, it is possible to use a pilot & data arrangement format, which has different frame length in FIG. 15. The number of pilot symbols is determined at a point when the pilot & data arrangement format is determined. For example, when the pilot & data arrangement format is determined as "0", as demonstrated in the relationship in FIG. 15 and FIG. 16, the value of received signal quality is "0" and the number of pilot symbols is "48".

In the pilot & data arrangement format described in the above embodiments, from all sub-carriers, apart of sub-carrier blocks may be assigned (for example, blocks of sub-carrier number 1-5). For example, it may be arranged so that the sub-carriers are previously grouped into several blocks and are assigned on the block basis. To be more specific, when there is little variation in the propagation path, there may be such a state that ten frames can be received using the same estimated channel value. In such case, for example, the first frame is arranged using such format that includes the pilots only and each of the second frame to the tenth frame is arranged using such format that includes data only so that the frame information in several frames can be determined; thus, the amount of transmission data can be increased.

As described above, according to the present invention, it is possible to change the pilot & data arrangement format, the number of pilot symbols and the power amplification rate depending on the value of received signal quality to generate the transmission signal frame of the OFDM signal. Owing to this, even in a channel of which received signal quality is poor, the transmission rate can be satisfactorily reduced using the adaptive modulation technique, and by changing the number of pilot symbols and the pilot & data arrangement format, the channel estimation accuracy also can be maintained at a satisfactory level. Thus, it is possible to prevent such a state of the communication failure.

Figure 20:
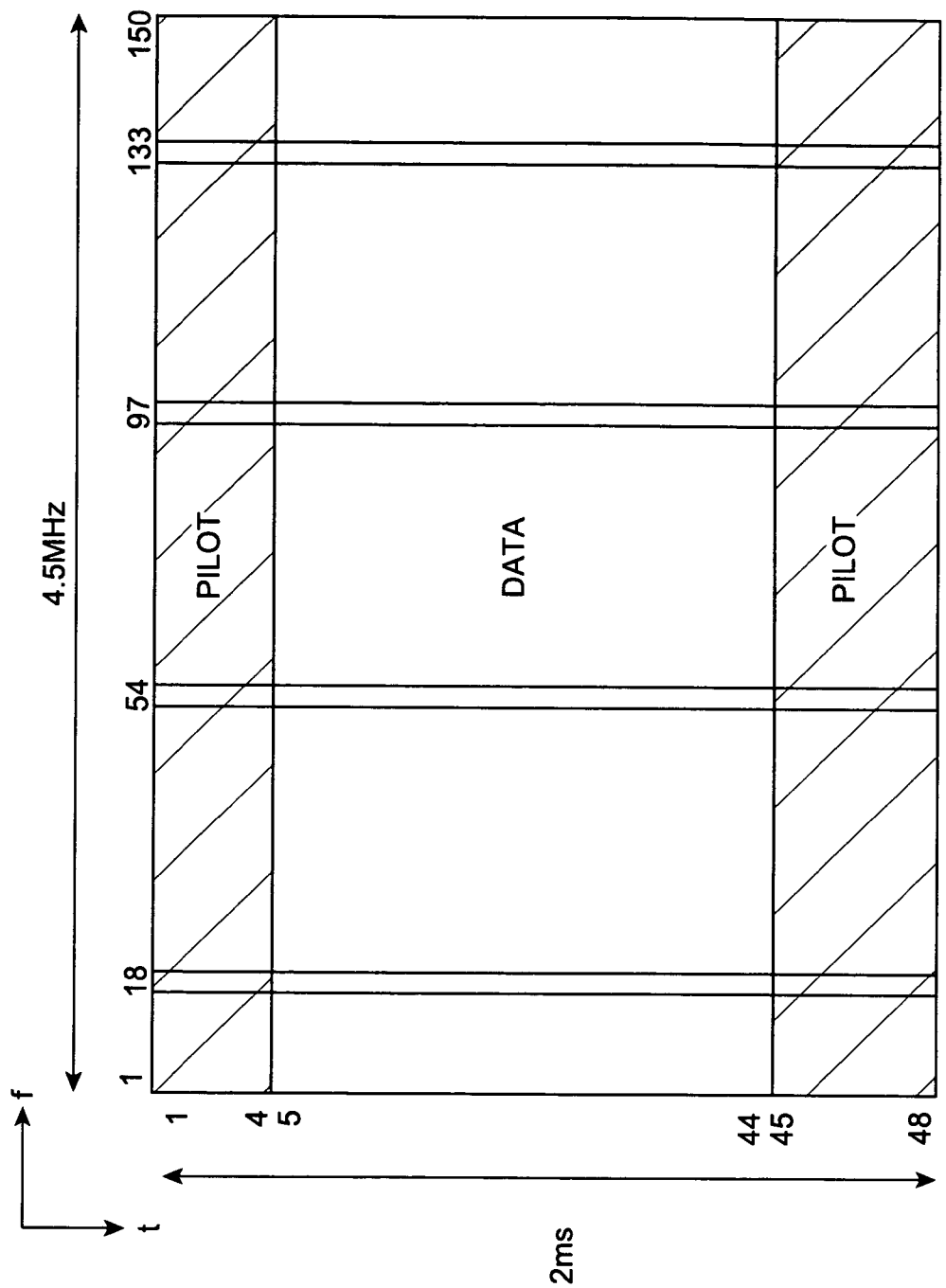
FIG. 20 is a view showing an example where only a data arrangement format is variable.

The embodiments described above show examples where both the pilot arrangement format and the data arrangement format are variable, but still further example where only the data arrangement format is variable, as shown in FIG. 20, can be implemented.

Furthermore, the embodiments described above show examples based on the frame structure using both head and tail pilot, but the present invention can be easily adapted to the frame structure using only either head or tail pilot, or to the frame structure using scattered pilot.

What is claimed is:

1. An OFDM signal frame generator, comprising:
rate determining means for determining rate information to generate a signal frame to be transmitted as an OFDM signal, the rate information being determined based on a value of a received signal quality of an OFDM signal that was received by a receiver, the value of the received signal quality being transmitted from the receiver to the generator;
pilot & data arrangement format determining means for determining a pilot & data arrangement format including a number of sub-carriers used of the OFDM signal that is to be transmitted, based on the value of the received signal quality, the pilot & data arrangement format determining means reducing the number of sub-carriers if the received signal quality is below a certain level;
pilot symbol number determining means for determining a number of pilot symbols for the signal frame of the OFDM signal that is to be transmitted, based on the value of the received signal quality;
power amplification rate determining means for determining a power amplification rate for the signal frame of the OFDM signal that is to be transmitted, based on the value of the received signal quality;
data symbol generating means for generating data symbol series to be transmitted with said signal frame of the OFDM signal, and the data symbol series being generated based on said rate information; and
transmission signal frame generating means for generating the signal frame of the OFDM signal that is to be transmitted, based on the generated data symbol series, the number of pilot symbols, and the power amplification rate.

2. The OFDM signal frame generator according to claim 1, wherein said value of received signal quality is fed back to the OFDM signal frame generator by said receiver.

3. The OFDM signal frame generator according to claim 1, wherein said pilot & data arrangement format is determined based on the number of sub-carriers used, the number of pilot symbols in the sub-carriers, and the number of data symbols in the sub-carriers.

4. The OFDM signal frame generator according to claim 3, wherein the number of sub-carriers used is selected at specific intervals on a frequency slot of the signal frame to be transmitted as an OFDM signal.

5. The OFDM signal frame generator according to claim 3, wherein frequencies of said sub-carriers used to transmit the signal frames are changed depending on a number of a frame.

6. The OFDM signal frame generator according to claim 1, wherein, in said pilot & data arrangement format, a frame length is variable depending on said value of received signal quality.

7. The OFDM signal frame generator according to claim 1, wherein said pilot & data arrangement format determining means assigns sub-carriers of the signal frame, to which the pilot & data arrangement format is applied based on said value of received signal quality and based on blocks of sub-carriers.

8. A transmitter configured to transmit an OFDM signal by using an OFDM signal frame generator, comprising:
rate determining means for determining rate information to generate a signal frame to be transmitted as an OFDM signal, the rate information being determined based on a value of a received signal quality of an OFDM signal that was received by a receiver, the value of the received signal quality being transmitted from the receiver to the transmitter;
pilot & data arrangement format determining means for determining a pilot & data arrangement format including a number of sub-carriers used of the OFDM signal that is to be transmitted, based on the value of the received signal quality, the pilot & data arrangement format determining means reducing the number of sub-carriers if the received signal quality is below a certain level;
pilot symbol number determining means for determining a number of pilot symbols for the signal frame of the OFDM signal that is to be transmitted, based on the value of the received signal quality;
power amplification rate determining means for determining a power amplification rate for the signal frame of the OFDM signal that is to be transmitted, based on the value of the received signal quality;
data symbol generating means for generating data symbol series to be transmitted with said signal frame, and the data symbol series being generated based on said rate information; and
transmission signal frame generating means for generating the signal frame of the OFDM signal that is to be transmitted, based the generated data symbol series, on the number of pilot symbols, and the power amplification rate.

9. A signal transmission system including a transmitter configured to transmit an OFDM signal and a receiver configured to receive the OFDM signal, wherein the receiver comprises:
received signal quality determining means for determining a value of a received signal quality of a received OFDM signal at the receiver; and
feedback means for feeding back the value of the received signal quality to said transmitter, and
wherein said transmitter comprises:
rate determining means for determining rate information to generate a signal frame to be transmitted as an OFDM signal, the rate information being determined based on the value of the received signal quality obtained by the feedback means;
pilot & data arrangement format determining means for determining a pilot & data arrangement format including a number of sub-carriers used of the OFDM signal that is to be transmitted, based on the value of the received signal quality, the pilot & data arrangement format determining means reducing the number of sub-carriers if the received signal quality is below a certain level;
pilot symbol number determining means for determining a number of pilot symbols for the signal frame of the OFDM signal that is to be transmitted, based on the value of the received signal quality;

power amplification rate determining means for determining a power amplification rate for the signal frame of the OFDM signal that is to be transmitted, based on the value of the received signal quality;

data symbol generating means for generating data symbol series to be transmitted with said signal frame of the OFDM signal, and the data symbol series being generated based on said rate information; and transmission signal frame generating means for generating the signal frame of the OFDM signal that is to be transmitted, based on the generated data symbol series, the number of pilot symbols, and based on the power amplification rate.

10. An OFDM signal frame generating method for generating a signal frame to be transmitted as an OFDM signal, the method comprising:

receiving a value of a signal quality of an OFDM signal that was previously transmitted to a receiver;

determining rate information to generate a signal frame to be transmitted as an OFDM signal, based on the value of the received signal quality;

determining a pilot & data arrangement format including a number of sub-carriers used of the OFDM signal that is to be transmitted, based on said value of received signal quality, by reducing the number of sub-carriers if the received signal quality is below a certain level;

determining a number of pilot symbols for the signal frame of the OFDM signal that is to be transmitted, based on said value of the received signal quality;

determining a power amplification rate for the signal frame of the OFDM signal that is to be transmitted, based on said value of the received signal quality;

generating data symbol series to be transmitted with said signal frame of the OFDM signal, the data symbol series being generated based on said rate information; and generating the signal frame of the OFDM signal that is to be transmitted, based on the generated data symbol series, said number of pilot symbols, and said power amplification rate.

11. An OFDM signal frame generator, comprising:

a rate determiner configured to determine rate information to generate a signal frame to be transmitted as an OFDM signal, the rate information being determined based on a value of a received signal quality of an OFDM signal that was received by a receiver, the value of the received signal quality being transmitted from the receiver to the generator;

a pilot & data arrangement format determiner configured to determine a pilot & data arrangement format including a number of sub-carriers used of the signal that is to be transmitted, based on the value of the received signal quality, the pilot & data arrangement format determiner reducing the number of sub-carriers if the received signal quality is below a certain level;

a pilot symbol number determiner configured to determine a number of pilot symbols for the signal frame of the signal that is to be transmitted, based on the value of the received signal quality;

a power amplification rate determiner configured to determine a power amplification rate for the signal frame of the signal that is to be transmitted, based on the value of the received signal quality;

a data symbol generator configured to generate data symbol series to be transmitted with said signal frame, and the data symbol series being generated based on the rate information; and a transmission signal frame generator configured to generate the signal frame of the OFDM signal that is to be transmitted, based on the generated data symbol series, the number of pilot symbols, and the power amplification rate.

12. The transmitter according to claim 8, wherein frequencies of said sub-carriers used to transmit the signal frames are changed depending on a number of a frame.

13. The signal transmission system according to claim 9, wherein frequencies of said sub-carriers used to transmit the signal frames are changed depending on a number of a frame.

14. The OFDM signal frame generating method according to claim 10, wherein frequencies of said sub-carriers used to transmit the signal frames are changed depending on a number of a frame.

15. The OFDM signal frame generator according to claim 11, wherein frequencies of said sub-carriers used to transmit the signal frames are changed depending on a number of a frame.

* * * * *